US008843119B2

(12) United States Patent
Erb

(10) Patent No.: US 8,843,119 B2
(45) Date of Patent: Sep. 23, 2014

(54) METHOD AND APPARATUS FOR CALL HANDLING

(75) Inventor: Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 215 days.

(21) Appl. No.: 12/800,410

(22) Filed: May 14, 2010

(65) Prior Publication Data
US 2011/0281561 A1 Nov. 17, 2011

(51) Int. Cl.
H04M 3/42 (2006.01)
H04M 3/02 (2006.01)
H04M 1/57 (2006.01)
H04M 1/725 (2006.01)

(52) U.S. Cl.
CPC ...... *H04M 3/42042* (2013.01); *H04M 3/42382* (2013.01); *H04M 2203/4527* (2013.01); *H04M 2203/654* (2013.01); *H04M 2203/255* (2013.01); *H04M 3/02* (2013.01); *H04M 1/575* (2013.01); *H04M 3/42051* (2013.01); *H04M 1/578* (2013.01); *H04M 2203/2038* (2013.01); *H04M 1/72583* (2013.01); *H04M 2242/22* (2013.01)
USPC ..... 455/414.1; 455/413; 455/415; 379/88.17; 379/80; 379/208.01; 379/37

(58) Field of Classification Search
USPC ............. 455/413, 414.1, 415; 379/80, 88.17, 379/208.01, 37
See application file for complete search history.

(56) References Cited

U.S. PATENT DOCUMENTS

| 6,253,075 | B1* | 6/2001 | Beghtol et al. ............... 455/415 |
|---|---|---|---|
| 6,470,181 | B1* | 10/2002 | Maxwell ....................... 455/413 |
| 6,665,534 | B1* | 12/2003 | Conklin et al. ............... 455/417 |
| 6,671,370 | B1* | 12/2003 | Heinonen et al. ......... 379/373.02 |
| 7,136,475 | B1* | 11/2006 | Rogers et al. ............ 379/213.01 |
| 7,904,061 | B1* | 3/2011 | Zaffino et al. .............. 455/414.1 |
| 2002/0051523 | A1* | 5/2002 | Erb ............................ 379/88.04 |
| 2002/0184346 | A1* | 12/2002 | Mani ............................ 709/220 |
| 2003/0043974 | A1* | 3/2003 | Emerson, III .............. 379/88.13 |
| 2003/0232629 | A1* | 12/2003 | Jang et al. ................... 455/552.1 |
| 2004/0001581 | A1* | 1/2004 | Chen et al. ................ 379/208.01 |
| 2004/0233892 | A1* | 11/2004 | Roberts et al. ................ 370/352 |
| 2005/0025296 | A1* | 2/2005 | Benco et al. ................ 379/88.22 |
| 2005/0243982 | A1 | 11/2005 | Starbuck |
| 2005/0243988 | A1* | 11/2005 | Barclay et al. ........... 379/207.13 |
| 2006/0072713 | A1 | 4/2006 | Fernandes |
| 2006/0072717 | A1* | 4/2006 | Jindal ......................... 379/88.17 |
| 2007/0019797 | A1* | 1/2007 | Morris ..................... 379/202.01 |
| 2007/0026852 | A1* | 2/2007 | Logan et al. ................ 455/422.1 |
| 2007/0081636 | A1* | 4/2007 | Shaffer et al. .................... 379/80 |
| 2007/0105531 | A1* | 5/2007 | Schroeder ..................... 455/411 |
| 2007/0127660 | A1* | 6/2007 | Roberts et al. ................ 379/161 |

(Continued)

FOREIGN PATENT DOCUMENTS

| EP | 1696545 A1 | 8/2006 |
|---|---|---|
| EP | 1988696 A1 | 11/2008 |
| WO | WO 2007006345 A1 | 1/2007 |
| WO | WO 2008144353 A1 | 11/2008 |

*Primary Examiner* — Kashif Siddiqui
*Assistant Examiner* — Mong-Thuy Tran

(57) ABSTRACT

There is provided a system and method of call handling comprising a first communications device having an acceptor of call purpose from a first party for a call, a communications channel including a conveyor of call purpose and a second communications device coupled to the first communications device via the communications channel and having a presenter of call purpose to a second party.

18 Claims, 4 Drawing Sheets

(56) References Cited

U.S. PATENT DOCUMENTS

| | | |
|---|---|---|
| 2007/0297599 A1* | 12/2007 | Sylvain .................... 379/373.01 |
| 2008/0045182 A1 | 2/2008 | Randall |
| 2008/0153503 A1* | 6/2008 | Birla et al. .................... 455/450 |
| 2008/0181374 A1* | 7/2008 | Script ........................ 379/88.23 |
| 2009/0006085 A1* | 1/2009 | Horvitz et al. ................ 704/223 |
| 2009/0238354 A1* | 9/2009 | Mani ........................ 379/201.02 |
| 2009/0252303 A1* | 10/2009 | Agarwal ........................ 379/37 |
| 2009/0328118 A1* | 12/2009 | Ravishankar et al. ........ 725/106 |
| 2010/0020958 A1* | 1/2010 | Roberts et al. ........... 379/215.01 |
| 2010/0061546 A1* | 3/2010 | Weiss et al. .................... 379/418 |
| 2010/0093315 A1* | 4/2010 | Grosch et al. .............. 455/412.2 |
| 2012/0096402 A1* | 4/2012 | Heiner et al. .................. 715/810 |

\* cited by examiner

METHOD AND APPARATUS FOR CALL HANDLING

FIELD OF THE INVENTION

The present invention relates to methods and apparatuses for call handling and is particularly concerned with call identification.

BACKGROUND TO THE INVENTION

When making a call that is not urgent, there are numerous cases when the call should be made but does not require an interruption or otherwise inconvenience to the person being called. However, the person receiving the call must answer before the urgency of the call can be determined.

For example, a dentist office making a call to remind someone of an appointment does not need the call to be answered as leaving a voicemail message is sufficient. The person answering the call may incur not just an interruption but also financial cost, particularly if they are on a cell phone in another geographic region when they answer the call (incurring both long distance and roaming charges).

As an alternative example, a call from a live TV show to offer someone a chance to win a luxury vacation requires immediate answer. In this case the person answering would want to take the interruption even if on their way out the door.

Caller ID display is a commonly supplied and commercially popular feature in telecom systems for both business and personal use. With this feature, the telephone number and in some embodiments, a name asserted with this number is displayed on a telephone for an incoming call. With this information, a user may assess whether or not to accept an incoming call or to allow for other call handling such as voice mail to be supplied. The called user is thus given control to assess the priority of an incoming call in relation to his/her current context. A user can utilize this to partition their attention so that they will not be distracted by matters which are not deserving of immediate attention.

The person being called can ignore the call, possibly after looking at the Caller ID, and hope a message would be left or to be called again if the call was actually urgent. Alternatively, the person being called can ignore all calls that would cause interruption or inconvenience.

In some cases, there may be a pre-arranged agreement that a call should be left to ring and would only be answered after a certain number of rings. However, this does not inter-work with voicemail functionality as the call would be routed to voicemail or the voicemail needs to be changed to answer after a longer number of rings (in which case most callers would hang up).

BRIEF DESCRIPTION OF THE DRAWINGS

The present disclosure will be further understood from the following detailed description with reference to the drawings in which.

DETAILED DESCRIPTION

Figure 1:
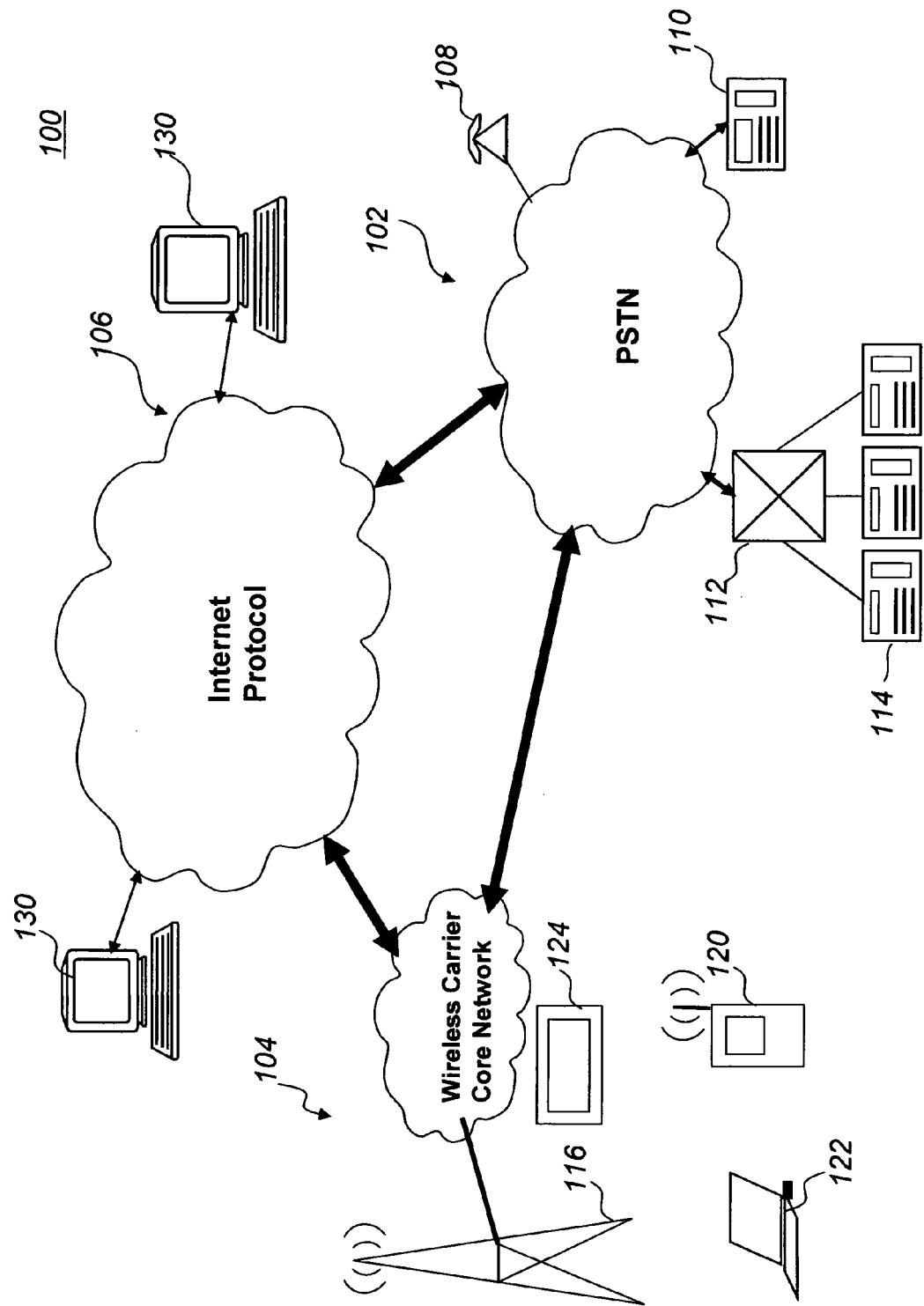
FIG. 1 illustrates a communications system in which an embodiment may be used.

Systems and methods disclosed herein provide a communication system for call handling to address at least some of the aforementioned disadvantages. A method of directing call presentation (including alerting) behaviour would be a useful feature for users and would make a vendor's telecom products more attractive in the market place.

Accordingly, the present disclosure provides technology that allows a caller to choose an option of how the call is presented to the called party. These options provide one or more indications that are applied to the call and affect the presentation. If the caller takes no action the call proceeds normally. Otherwise, the indication provided by the caller is associated with the call. Additional feature signaling is performed between the originating system and the destination system to pass the associated indication(s). The destination system then modifies the call presentation in dependence upon the associated indication(s). The presentation options may be constrained due to the type of device terminating the call. The called party equipment may use a subset of presentation options as appropriate.

In accordance with an embodiment there is provided a system for call handling comprising an acceptor of directed call presentation from a first party for a call, a conveyor of directed call presentation and a designator of directed call presentation to a second party.

This disclosure describes a directed call presentation system. The caller indicates the importance and/or urgency of the call being placed.

The caller may indicate the call should go directly to voicemail and not cause an interruption.

The caller may indicate the call should not go to voicemail at all.

The caller may also indicate the nature of the call such that the person called can decide to answer or let the call go to voicemail.

The call presentation is altered by the system based on the indications provided by the caller.

In accordance with another embodiment there is provided a method comprising accepting a directed call presentation indicators from a first party for a call, conveying the directed call presentation indicators from the first party to a second party and presenting the call to the second party in dependence upon the directed call presentation indicators.

Conveniently, the directed call presentation is facilitated by three distinct pieces of technology. These are:

a) Means by which directed call presentation indicators can be entered by the call originator.

b) Means by which directed call presentation indicators can be associated with the call in the call invitation and for further extensions to the call such as call forwarding, call detail recording, call archiving.

c) Means by which the directed call presentation indicators can be used to affect how the call is presented to the called party.

In accordance with a further embodiment there is provided a system for call handling comprising a first communications device having an acceptor of directed call presentation indicators from a first party for a call, a communications channel including a conveyor of directed call presentation indicators and a second communications device coupled to the first communications device via the communications channel and having a presenter responsive to the directed call presentation indicators to affect how the call is presented to a second party.

These technologies although they are related by the need for interworking are distinct and will be described separately in the following sections.

The description below is based on two alternative means by which to originate and receive telephone calls. These are by a telephone and a computer interface. The telephone is assumed to have the expected voice and limited control interfaces. Both traditional analog and digital (IP and TDM-ISDN etc.) telephones are discussed. A computer interface assumes a voice and control interface. The control interface assumes the extensive screen and keyboard, capabilities that are typically for a computer. The computer control interface may utilize GUI technology. Cellular telephones, portable computers, netbooks and other portable devices combine aspects of both of these types of interfaces. The use of such devices is covered by the specific descriptions of the computer and telephone interfaces. A person of ordinary skill in the art will understand how the specific aspects of each interface may be adapted to these devices which exhibit characteristics of both.

Referring to FIG. 1 there is illustrated a communications system in which an embodiment may be used. The communications system 100 includes a public switch telephone network (PSTN) 102, a wireless communications network 104 and an Internet protocol (IP) network 106. Each network 102, 104 and 106 is interconnected so that end users can communicate with each other. The PSTN network 102 may have a variety of end user devices connected to it. These included, but are not limited to plain old telephone system (POTS) telephones 108, ISDN telephones 110, public branch exchanges (PBX) 112 and their associated telephones 114. Similarly, the wireless communications network 104 may have traditional handheld wireless telephones 120, wireless computing devices 122, and personal data assistant (PDA) devices 124 coupled to it. Finally, the Internet protocol network 106 may have a wide variety of computing devices 130 coupled to it. Whenever an end user wishes to contact another end user, some kind of a call set up is necessary.

One of the issues in the modern world is having to prioritize one's activities both at work and at home. With the omnipresence of communications devices, a large part of that prioritization has to do with accepting incoming calls on whatever type of device the user may have in their possession at the time the call is received. As discussed above, it would be extremely useful to have an indication of the reason for the call before answering the call. The present disclosure proves a method and apparatus for providing to a called party, a directed call presentation appropriate to the urgency or importance of the call. The called party can then handle the call based at upon how it is presented.

Figure 2:
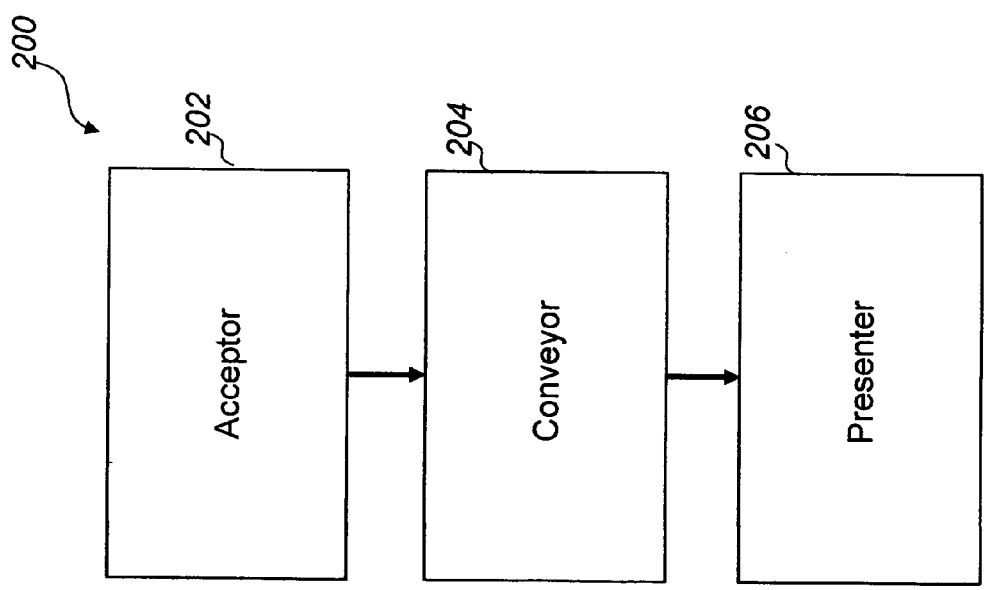
FIG. 2 illustrates a system for providing directed call presentation in accordance with an embodiment.

Referring to FIG. 2, there is illustrated a system for providing directed call presentation. The system 200 includes an acceptor 202 for accepting directed call presentation indicators from a calling party. The system also includes a conveyor 204 for carrying the directed call presentation indicators from the calling party to a called party. Finally the system includes a presenter 206 for presenting the call to the called party in dependence upon the directed call presentation indicators.

Figure 3:
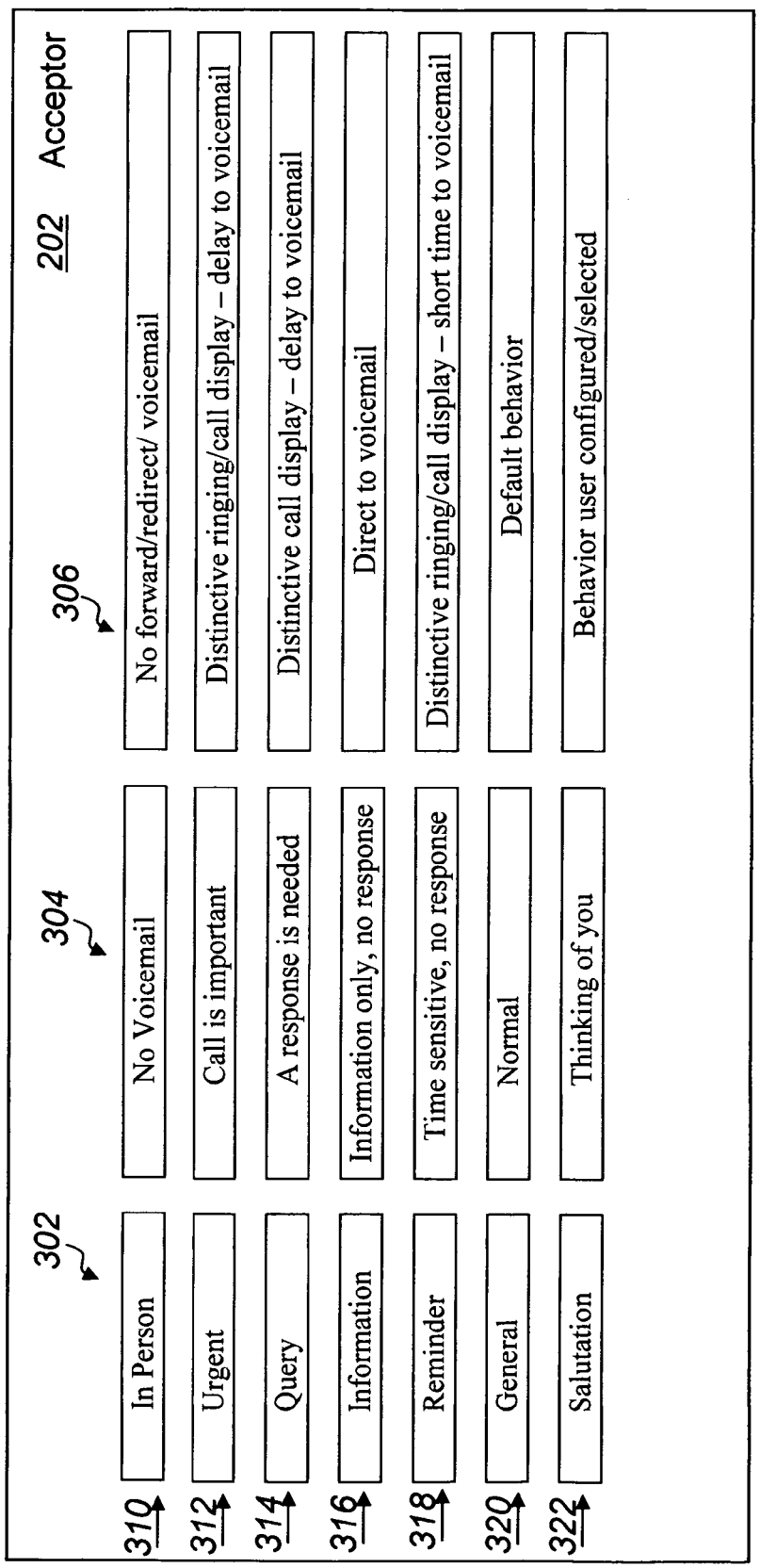
FIG. 3 illustrates an acceptor of FIG. 2 in further detail.

Referring to FIG. 3 there is illustrated an example of acceptor 202 of FIG. 2 in further detail. The acceptor 202 includes a table that relates indication 302 and intention 304 to the call presentation treatment 306 options available to a calling party:

a) In person 310;
b) Urgent 312;
c) Query 314;
d) Informative 316;
e) Reminder 318;
f) General 320; and
g) Salutation 322.

Indications 302 for directed call presentation may be defined by an industry standard or may be vendor specific and are listed in order of priority treatment. Each indication 302 has an associated intention 304 for how the call should be handled. Preferably well known or intuitive so that the intention would be understood by the calling party and the called party. The call presentation treatment 306 by the destination system for each indication appropriately reflects the intention based on system capability and feature interactions. When multiple indications are received any behavior conflicts are resolved based on the treatment priority.

The following are examples of how the indications and intentions could be used. The indication "in person" 310 corresponds to an intention of no voicemail; the call presentation treatment is no forward/redirect/voicemail. The indication "urgent" 312 corresponds to an intention of "call is important"; the call presentation treatment is distinctive ringing/call display [longer time before transfer to voicemail]. The indication "query" 314 corresponds to an intention of "a response is needed"; the call presentation treatment is distinctive call display [longer time before transfer to voicemail]. The indication "informative" 316 corresponds to an intention of "information only, no response needed"; the call presentation treatment is direct to voicemail The indication "reminder" 318 corresponds to an intention of time sensitive, no response needed; the call presentation treatment is distinctive ringing/call display [shorter time before transfer to voicemail]. The indication "general" 320 corresponds to an intention of normal; the call presentation treatment is default behavior. The indication "salutation" 322 corresponds to an intention of thinking of you; the call presentation treatment is behavior is user configured/selected.

Each of these methods of assignment may be done from any of the end user devices shown in FIG. 1, for example from a telephone or computer interface.

In both the telephone and computer interface, the user may select an indication 302. In the telephone interface, a user can indicate a desire to indicate call presentation by entering a feature access code before the dialed digit information. For example, a feature access code of *80 may be chosen and the user would dial *80 before the called party's directory number. The user would then be given a voice announcement to select the call indication by selecting from a menu. Speech recognition may be used to collect the calling parties selection or the calling party may use the DTMF keys.

Optionally, when a call is proceeding, that is during or after dialing and before ring back, the system, e.g. the originating Mitel 3300 ICP, provides the caller with an option to add one or more call presentation indications. This is determined by COS, class of service, of the caller and/or system configuration.

As an example, the display of an IP Phone allows selection of one or more indications using buttons on the phone while dialing a number. If the user does not provide any indications 318, the call proceeds normally.

The originating system includes the indication(s) in feature signalling associated with establishing the call. If the destination system does not support the indication(s) the call proceeds normally.

The designation system obtains the indication(s) associated with the call before normal call presentation behaviour is performed. The system establishes the default call presentation behaviour for the call based on system/user configuration. For each indication provided, in priority order, the system updates the call presentation behaviour with the call presentation treatments. If a behaviour conflict would occur (or has already been changed) the call presentation behaviour is not changed. The call then proceeds using the modified call presentation behaviour.

For example, if the caller selects 'in person' and 'reminder' the modified call presentation behaviour would provide the distinctive ringing/call display for reminder but not transfer to voicemail. Selecting 'urgent' and 'informative' would only use the call presentation treatment for 'urgent'.

For the computer interface, a GUI provides controls such as drop-down menus, for selecting the indication desired.

The section above has described how a user may select to have a indication of directed call display associated with their outgoing call. The association with the call, may be done by placing a special indication in the call invitation message. For SIP, this may take the form of a special header similar to the one that is used for Caller ID. The file may be placed in the field associated with this header or a URL pointing the file may be placed there. This information associated with this header may be extracted and used by the receiver. This header and its information may also be used by the receiver if it chooses to extend the call by redirection or forwarding.

Figure 4:
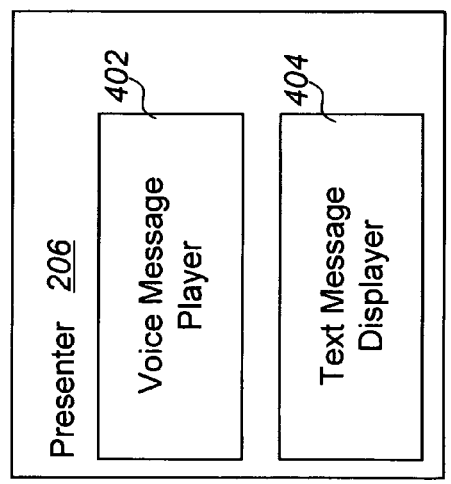
FIG. 4 illustrates a presenter of FIG. 2 in further detail.

This section describes how directed call presentation indication results in how the call is displayed/heard on various expected devices. Referring to FIG. 4 there is illustrated a presenter of FIG. 2 in further detail. The presenter 206 resides in the end user terminal and includes at least one of a voice message player 402 and a text message display 404. Certain devices may have only limited capability for the display of one modality. For example, analog telephones will have only limited, if any, text display capability. In such cases, messages in the modality of the less capable display may automatically be converted to the other modality.

An analog telephone may have only a minimal display that is normally used for only call ID display information. As well, the bandwidth of the channel for transferring text information can be quite limited. For example, the caller ID information is transferred between the first and second rings. Thus for an analog telephone, the directed call presentation may often be presented as a voice message.

Various ways are possible for presenting the voice message. In one method, a tone indication is given to indicate that an announcement is available. The user may then enter a DTMF code to trigger the playing of the announcement. The user will then have the option of receiving the call of indicating some other disposition for it. Alternatively, the announcement may be placed automatically with the user either given the option of indicating a disposition of the call or alternatively having the call automatically cut through after the announcement.

If the display of the message as text is desired then the text can be downloaded between ring cycles as in the caller id example or after the call is answered. In each case, the text may be displayed on the display usually used for caller id display. To overcome the case in which the display is of limited size, the message may be scrolled though on the display either line by line, word by word or letter by letter or alternating the display of the caller ID and the call purpose.

For digital (ISDN, PBX etc.) or IP telephones, the bandwidth for transfer of messages (text and voice) can be quite large. The telephone itself is much more autonomous than in the analog case which gives much greater possibilities for it. The digital or IP telephone may supply all methods described above for analog telephones for the display of the announcement plus additional ones that take advantage of the special capabilities of the digital telephone. For example, a digital telephone is not supplied with ringing current but generates its own ringing or alerting signal upon reception of a call invitation message from its controller or proxy. It is common for cell phones to play ringtones that are musical pieces selected by the user. In the case of this disclosure, digital or IP telephones may play the call purpose announcement message as their call alerting signal.

The typically larger display, in contrast to the analog telephone, will allow the display of text messages for these digital and IP telephones.

A computer may be supplied with a display to present the call purpose announcement among other things on the reception of an incoming call. The above-referenced copending Mitel application teaches the display of a GUI on the reception of call information that displays information about the caller as well as data about the current context in which the call is being initiated. This GUI display may be expanded to display both text and voice messages. A text message may be displayed in a dedicated box, pop up box etc. while the voice message may be played with the first appearance of the GUI as an alerting message. Alternatively the GUI may contain controls that will allow the call announcement message to be played at the user's option and replayed at will.

A number of GUIs will allow for the creation of call purpose announcements. For example, the automatic creation description above describes how calls may be set up from a user diary or calendar application and with that the default announcement set to an appropriate one. Similar to this is the GUI that is normally used for IM (instant messaging). It can be useful for an ongoing conversation to move from IM to voice and it would be useful to users if this could be done directly from the IM GUI. So the user could select a button or use some other means of indicating the he or she wishes to add a voice connection to the conversation. In such a case, the option can be provided to allow the user to enter a call purpose announcement message as text through the IM GUI. One non-limiting example would be to select the last IM text entry in the GUI the default call purpose announcement message. This may be sent directly or the user could be given options to provide and edit a voice announcement or to edit the just selected default message.

The signaling of indications for directed call presentation between communication systems may involve explicit support by a signaling protocol (e.g. SIP feature handling included in the SIP protocol specification) or without explicit support (e.g. using vendor specific end to end messages).

The indications available and their associated affect on call presentation may differ depending on system capability and implementation. These criterion and their treatments may also be affected by system configuration and/or feature interaction.

Additional indications may be supported to affect the behaviour of other services or inter-working applications (e.g. attendant handling).

Effects on call presentation may involve other features that may or may not affect call presentation (e.g. SMDR, station message detail recording).

Additional indications may be associated with the call that would allow the called person to determine how the call should be handled before answering. As well, the information may also be used to affect call presentation and/or handling after the call has been answered.

Numerous modifications, variations and adaptations may be made to the particular embodiments described above without departing from the scope patent disclosure, which is defined in the claims.

What is claimed is:
1. A system for directed call presentation comprising:
an acceptor of at least one directed call presentation indication of a plurality of priority ordered call presentation indications from a first party for a single, call, wherein the plurality of priority ordered call presentation indications are, derived from a communications channel;

a conveyor of said at least one directed call presentation indication; and a presenter of the call to a second party in dependence upon said at least one directed call presentation indication, wherein each call presentation indication has an associated intention and call presentation treatment for controlling each said call presentation wherein any behavior conflicts resulting from receipt, by said acceptor, of multiple indications derived from said communications channel for said single call are resolved by said presenter based on said priority.

2. The system of claim 1, wherein the plurality of indications includes at least one of in person, urgent, Query, informative, reminder, general and salutation.

3. The system of claim 1, wherein the acceptor includes a voice message system.

4. The system of claim 3, wherein the voice message system includes a speech recognizer.

5. The system of claim 1, wherein the presenter includes an audio output device.

6. The system of claim 5, wherein the presenter includes a text-to-speech converter.

7. The system of claim 1, wherein the presenter includes a visual display device.

8. The system of claim 1, wherein the conveyor includes a field in a call set up message for directed call presentation indication.

9. A method of call handling, the method comprising:

accepting at least one directed call presentation indication of a plurality of priority ordered call presentation indications from a first party for a single call, wherein the plurality of priority ordered call presentation indications are derived from a communications channel;

conveying said at least one directed call presentation indication from the first party to a second party; and presenting the call to the second party in dependence upon said at least one directed call presentation indication, wherein each call presentation indication has an associated intention and call presentation treatment for controlling each said call presentation wherein any behavior conflicts resulting from receipt, by said acceptor, of multiple indications derived from said communications channel for said single call are resolved by said presenter based on said priority.

10. The method of claim 9, wherein the step of presenting provides a distinctive ring.

11. The method of claim 9, wherein the step of presenting provides a distinctive call display.

12. The method of claim 9, wherein the step of presenting includes a distinctive display and ring.

13. The method of claim 9, wherein the step of presenting includes passing directly to voicemail.

14. The method of claim 9, wherein the step of accepting includes the step of presenting a selection list to the first party.

15. The method of claim 9 wherein the step of accepting includes the steps of presenting a plurality of indications to the first party and receiving a selection from the first party.

16. The method of claim 9 wherein the step of conveying includes the step of associating the directed call presentation indication with the call.

17. The method of claim 9 wherein the step of conveying includes the step of placing the directed call presentation indication in a call record for the call.

18. A system for call handling comprising:

a first communications device having an acceptor of at least one directed call presentation indication of a plurality of priority ordered call presentation indications from a first party for a single call;

a communications channel including a conveyor of said at least one directed call presentation indication, wherein the plurality of priority ordered call presentation indications are derived from said communications channel; and a second communications device coupled to the first communications device via the communications channel and having a presenter of the call to a second party in dependence upon said at least one directed call presentation indication, wherein each call presentation indication has an associated intention and call presentation treatment for controlling each said call presentation wherein any behavior conflicts resulting from receipt, by said acceptor, of multiple indications derived from said communications channel for said single call are resolved by said presenter based on said priority.

* * * * *